(12) United States Patent
Uchizono et al.

(10) Patent No.: US 12,521,790 B2
(45) Date of Patent: Jan. 13, 2026

(54) THIXOMOLDING MATERIAL (71) Applicant: SEIKO EPSON CORPORATION, Tokyo (JP)

(72) Inventors: Shunsuke Uchizono, Shiojiri (JP); Setsuya Iwashita, Nirasaki (JP); Yasutoshi Hideshima, Matsumoto (JP); Fumiya Maeda, Azumino (JP); Koichi Ozaki, Okayama (JP); Tadao Fukuta, Kurashiki (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/518,761

(22) Filed: Nov. 24, 2023

(65) Prior Publication Data

US 2024/0091851 A1   Mar. 21, 2024

Related U.S. Application Data (62) Division of application No. 17/656,600, filed on Mar. 25, 2022, now Pat. No. 11,878,345.

(30) Foreign Application Priority Data

Mar. 30, 2021 (JP) .............................. 2021-057131

(51) Int. Cl.
*B22D 17/00* (2006.01)
*B22F 1/05* (2022.01)
(Continued)

(52) U.S. Cl.
CPC .............. *B22F 1/16* (2022.01); *B22D 17/007* (2013.01); *B22F 1/05* (2022.01); *B22F 1/102* (2022.01);
(Continued)

(58) Field of Classification Search
CPC ............ B22F 2998/10; B22F 2302/105; B22F 2301/058; B22F 8/00; B22F 3/225;
(Continued)

(56) References Cited

U.S. PATENT DOCUMENTS 4,657,065 A * 4/1987 Wada ..................... B22D 19/14
164/97
5,273,569 A * 12/1993 Gilman .................. C22C 1/1084
428/614
(Continued)

FOREIGN PATENT DOCUMENTS

JP    H06256809 A    9/1994
JP    H08120390 A    5/1996
(Continued)

OTHER PUBLICATIONS

Rudajevová, A. and Lukáč, P. (2000). Thermal Conductivity of SiC Reinforced Magnesium Matrix Composites. In Microstructural Investigation and Analysis, B. Jouffrey (Ed.). https://doi.org/10.1002/3527606165.ch27 (Apr. 20, 2000) (pp. 179-183). (Year: 2000).*

(Continued)

Primary Examiner — Michael E. La Villa
(74) Attorney, Agent, or Firm — CHIP LAW GROUP (57) ABSTRACT

A thixomolding material includes: a metal body that contains Mg as a main component; and a coating portion that is adhered to a surface of the metal body via a binder and contains SiC particles containing SiC as a main component. A mass fraction of the SiC particles in a total mass of the metal body and the SiC particles is 2.0 mass % or more and 40.0 mass % or less. The binder may contain waxes. A content of the binder may be 0.001 mass % or more and 0.200 mass % or less.

2 Claims, 3 Drawing Sheets

(51) Int. Cl.

| | | |
|---|---|---|
| *B22F 1/102* | (2022.01) | |
| *B22F 1/14* | (2022.01) | |
| *B22F 1/16* | (2022.01) | |
| *B22F 3/22* | (2006.01) | |
| *C22C 1/04* | (2023.01) | |
| *C22C 1/051* | (2023.01) | |
| *C22C 1/10* | (2023.01) | |
| *C22C 23/00* | (2006.01) | |
| *C22C 23/02* | (2006.01) | |
| *C22C 23/04* | (2006.01) | |
| *C22C 23/06* | (2006.01) | |
| *C22C 29/00* | (2006.01) | |
| *C22C 29/06* | (2006.01) | |
| *C22C 32/00* | (2006.01) | |
| *B22F 3/00* | (2021.01) | |
| *B22F 8/00* | (2006.01) | |
| *C22C 1/05* | (2023.01) | |

(52) U.S. Cl.
CPC ............... *B22F 1/14* (2022.01); *B22F 3/225* (2013.01); *C22C 1/0408* (2013.01); *C22C 1/051* (2013.01); *C22C 1/1084* (2013.01); *C22C 23/00* (2013.01); *C22C 23/02* (2013.01); *C22C 23/04* (2013.01); *C22C 23/06* (2013.01); *C22C 29/00* (2013.01); *C22C 29/005* (2013.01); *C22C 29/065* (2013.01); *C22C 29/067* (2013.01); *C22C 32/00* (2013.01); *C22C 32/0047* (2013.01); *C22C 32/0052* (2013.01); *C22C 32/0063* (2013.01); *B22F 3/003* (2013.01); *B22F 8/00* (2013.01); *B22F 2301/058* (2013.01); *B22F 2302/105* (2013.01); *B22F 2998/10* (2013.01); *C22C 1/05* (2013.01); *Y10T 428/12181* (2015.01); *Y10T 428/12556* (2015.01); *Y10T 428/12576* (2015.01); *Y10T 428/12729* (2015.01); *Y10T 428/2438* (2015.01); *Y10T 428/24405* (2015.01); *Y10T 428/24413* (2015.01); *Y10T 428/24421* (2015.01); *Y10T 428/29* (2015.01); *Y10T 428/2982* (2015.01); *Y10T 428/2991* (2015.01); *Y10T 428/2993* (2015.01); *Y10T 428/2998* (2015.01)

(58) Field of Classification Search
CPC .... B22F 3/003; B22F 1/16; B22F 1/05; B22F 1/102; B22F 1/14; B22F 1/107; B22F 1/142; B22D 17/007; C22C 1/0408; C22C 1/051; C22C 1/1084; C22C 1/05; C22C 23/00; C22C 23/02; C22C 23/04; C22C 23/06; C22C 32/00; C22C 32/0063; C22C 32/0047; C22C 32/0052; C22C 29/00; C22C 29/005; C22C 29/065; C22C 29/067; Y10T 428/12181; Y10T 428/12556; Y10T 428/12576; Y10T 428/12729; Y10T 428/2438; Y10T 428/24405; Y10T 428/24413; Y10T 428/24421; Y10T 428/29; Y10T 428/2982; Y10T 428/2991; Y10T 428/2993; Y10T 428/2998
See application file for complete search history.

(56) References Cited

U.S. PATENT DOCUMENTS

| | | |
|---|---|---|
| 2005/0194115 A1 | 9/2005 | Noguchi et al. |
| 2006/0057015 A1 | 3/2006 | Kondoh |
| 2008/0213118 A1 | 9/2008 | Kondoh |
| 2011/0256419 A1 | 10/2011 | Iwayama et al. |
| 2015/0225635 A1 | 8/2015 | Iwayama et al. |
| 2017/0268088 A1* | 9/2017 | Sherman ................ C22C 23/00 |

FOREIGN PATENT DOCUMENTS

| | | | |
|---|---|---|---|
| JP | 2007277651 A | 10/2007 | |
| JP | 2008075127 A | 4/2008 | |
| JP | 2010090436 A | 4/2010 | |
| JP | 5070564 B2 * | 11/2012 | .......... B21C 23/002 |
| JP | 2018040034 A | 3/2018 | |
| JP | 2020059894 A | 4/2020 | |
| WO | 2004062837 A | 7/2004 | |

OTHER PUBLICATIONS

Machine Translation, Kiyoshi et al., JP 5070564 B2, Nov. 14, 2012. (Year: 2012).*
Office Action for JP Patent Application No. JP2021057131, issued on Jan. 21, 2025, 10 pages.

* cited by examiner

THIXOMOLDING MATERIAL

This application is a divisional application of U.S. patent application Ser. No. 17/656,600, filed on Mar. 25, 2022, which claims priority from JP Application Serial Number 2021-057131, filed Mar. 30, 2021. Each of the above-referenced applications is hereby incorporated herein by reference in its entirety.

BACKGROUND

1. Technical Field

The present disclosure relates to a thixomolding material, a method for manufacturing a thixomolding material, and a thixomolded article.

2. Related Art

Magnesium has properties such as a low specific gravity, a good electromagnetic wave shielding property, good vibration damping capability, good machinability, and good biosafety. Based on such a background, parts made of magnesium alloys are beginning to be used in products such as automobiles, aircraft, mobile phones, and notebook computers.

For example, JP-A-2010-90436 discloses a magnesium-based composite material in which SiC is dispersed in a base material made of magnesium or a magnesium alloy. In addition, examples of a method for manufacturing such a composite material include a method in which SiC is placed in a mold, impregnated with a molten metal of magnesium, and then the obtained solidified product is pressurized.

In the method described in JP-A-2010-90436, SiC is placed in the mold in advance, and then the molten metal of magnesium is introduced into the mold to form a composite. In this method, it is necessary to bring SiC and magnesium into contact with each other and mix the two substances in the mold, but it is difficult to uniformly mix the two substances due to a shape of the mold. Therefore, there is a problem that homogeneity of a molded article to be manufactured is reduced, and mechanical strength and rigidity of the molded article are reduced.

SUMMARY

A thixomolding material according to an application example of the present disclosure includes: a metal body that contains Mg as a main component; and a coating portion that is adhered to a surface of the metal body via a binder and contains SiC particles containing SiC as a main component. A mass fraction of the SiC particles in a total mass of the metal body and the SiC particles is 2.0 mass % or more and 40.0 mass % or less.

A method for manufacturing a thixomolding material according to an application example of the present disclosure includes: a preparation step of preparing a mixture containing a metal body containing Mg as a main component, SiC particles containing SiC as a main component, a binder, and a solvent; a stirring step of stirring the mixture; and a debindering step of removing, by heating the stirred mixture, at least a part of the binder contained in the mixture. A mass fraction of the SiC particles in a total mass of the metal body and the SiC particles is 2.0 mass % or more and 40.0 mass % or less, and a content of the binder is 0.001 mass % or more and 0.200 mass % or less.

A thixomolded article according to an application example of the present disclosure includes: a matrix portion that contains Mg as a main component; and a particle portion that is dispersed in the matrix portion and contains SiC as a main component. A content of SiC is 2.0 mass % or more and 40.0 mass % or less.

DESCRIPTION OF EXEMPLARY EMBODIMENTS

Hereinafter, a thixomolding material, a method for manufacturing a thixomolding material, and a thixomolded article according to the present disclosure will be described in detail based on embodiments illustrated in the accompanying drawings.

1. Thixomolding Method

First, a thixomolding method using a thixomolding material according to an embodiment will be described.

The thixomolding method is a molding method in which a pellet-like or chip-like material is heated in a cylinder to bring the material into a solid-liquid coexistence state in which a liquid phase and a solid phase coexist, then thixotropy is developed by rotation of a screw, and the obtained semi-solidified product is injected into a mold. According to such a thixomolding method, since fluidity of the semi-solidified product is enhanced by heating and shearing, a part having a small thickness or a part having a complicated shape can be formed as compared with a die casting method.

Figure 1:
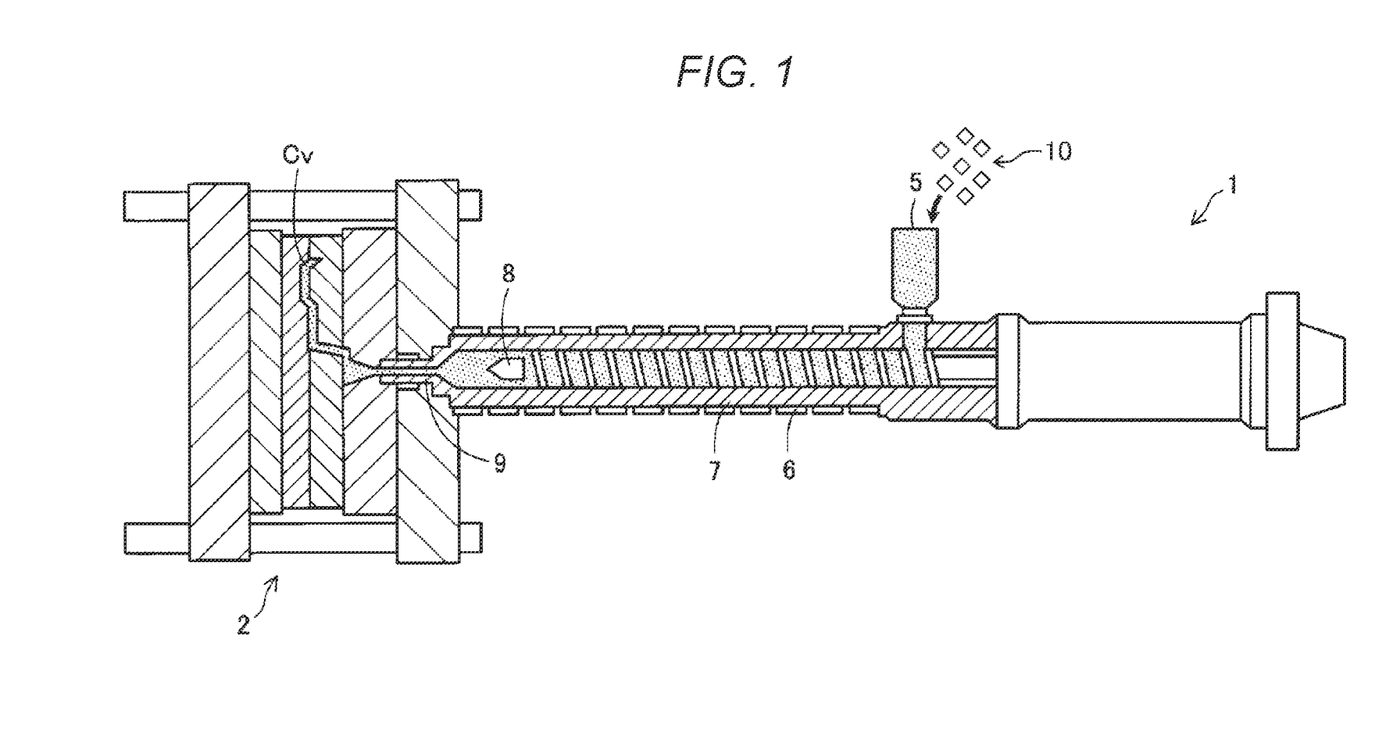
FIG. 1 is a cross-sectional view showing an example of an injection molding machine used for a thixomolding method.

FIG. 1 is a cross-sectional view showing an example of an injection molding machine used for the thixomolding method.

As shown in FIG. 1, an injection molding machine 1 includes a mold 2, a hopper 5, a heating cylinder 7, a screw 8, and a nozzle 9. In the mold 2, a cavity Cv is formed. When a thixomolding material 10 is charged into the hopper 5, the thixomolding material 10 is supplied to the heating cylinder 7. The thixomolding material 10 supplied to the heating cylinder 7 is transferred while being heated by a heater 6 and being sheared by the screw 8. Accordingly, the thixomolding material 10 is semi-melted and slurried. The obtained slurry is injected into the cavity Cv in the mold 2 through the nozzle 9 without being exposed to the atmosphere. Then, the slurry injected into the cavity Cv is cooled to obtain a thixomolded article.

The hopper 5 may be charged with other materials together with the thixomolding material 10.

2. Thixomolding Material

Next, a thixomolding material according to an embodiment will be described.

Figure 2:
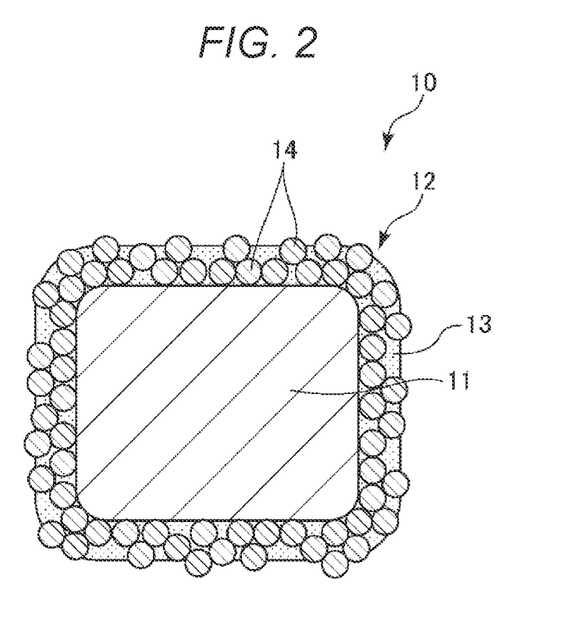
FIG. 2 is a cross-sectional view schematically showing a thixomolding material according to an embodiment.

FIG. 2 is a cross-sectional view schematically showing a thixomolding material according to the embodiment.

The thixomolding material 10 shown in FIG. 2 is a raw material to be used in the thixomolding method, and includes a chip-like metal body 11, a coating portion 12 that adheres to the surface of the metal body 11, and an adhesive portion 13 that contains a binder and adheres the metal body 11 to the coating portion 12.

2.1. Metal Body

The metal body 11 is, for example, a section obtained by machining or cutting an Mg-based alloy cast with a mold or the like. A method for manufacturing the metal body 11 is not limited thereto.

The metal body 11 contains Mg as a main component and contains various additive components. Examples of the additive components include lithium, beryllium, calcium, aluminum, silicon, manganese, iron, nickel, copper, zinc, strontium, yttrium, zirconium, silver, tin, gold, and rare earth elements, and a mixture of one or more of the additive components is used. Examples of the rare earth elements include cerium.

The main component refers to an element having the highest content in the metal body 11. The content of the main component is preferably more than 50 mass %, more preferably 70 mass % or more, and still more preferably 80 mass % or more.

The additive components preferably include aluminum and zinc. Accordingly, the melting point of the metal body 11 is lowered, and the fluidity of the slurry is improved. As a result, moldability of the thixomolding material 10 can be enhanced.

In addition, the additive components may include at least one selected from the group consisting of manganese, yttrium, strontium, and rare earth elements in addition to aluminum and zinc. Accordingly, mechanical properties, corrosion resistance, abrasion resistance, and thermal conductivity of the thixomolded article can be enhanced.

The additive components may be present in a form of a simple substance, an alloy, an oxide, an intermetallic compound, and the like in the metal body 11. In addition, the additive components may be segregated or uniformly dispersed in a crystal grain boundary of a metal structure such as Mg or an Mg alloy in the metal body 11.

The average particle diameter of the thixomolding material 10 is not particularly limited, and is preferably 0.5 mm or more, and more preferably 1.5 mm or more and 10 mm or less. By setting the average particle diameter within the above range, generation of bridges and the like in the heating cylinder 7 of the injection molding machine 1 can be prevented.

The average particle diameter of the thixomolding material 10 is an average value of diameters of circles having the same area as a projected area of the thixomolding material 10. The average value is calculated based on 100 or more thixomolding materials 10 selected at random.

An average aspect ratio of the thixomolding material 10 is preferably 5.0 or less, and more preferably 4.0 or less. In the thixomolding material 10 having such an average aspect ratio, a filling property in the heating cylinder 7 is enhanced and temperature uniformity during heating is improved. As a result, a thixomolded article having high mechanical properties and high dimensional accuracy can be obtained.

The average aspect ratio of the thixomolding material 10 is an average value of aspect ratios calculated based on major axis/minor axis in a projection image of the thixomolding material 10. The average value is calculated based on 100 or more thixomolding materials 10 selected at random. The major axis is the maximum length that can be taken in the projection image, and the minor axis is the maximum length in the direction orthogonal to the major axis.

2.2. Coating Portion

The coating portion 12 contains SiC particles 14 containing SiC as a main component. Specifically, for example, a plurality of SiC particles 14 are adhered to the surface of the metal body 11 to form the coating portion 12.

The coating portion 12 preferably covers the entire surface of the metal body 11, or may cover a part of the surface.

The SiC particles 14 are not particularly limited as long as they are particles containing silicon carbide as a main component, and the SiC particles 14 may be particles containing amorphous SiC as a main component, or may be particles containing crystalline SiC as a main component.

The average particle diameter of the SiC particles 14 is 0.3 μm or more and 20 μm or less, preferably 1 μm or more and 15 μm or less, and more preferably 2 μm or more and 10 μm or less. By setting the average particle diameter of the SiC particles 14 within the above range, the balance between a coverage of the coating portion 12 and the SiC content in the thixomolding material 10 can be optimized. In addition, when the SiC particles 14 are adhered to the surface of the metal body 11, the SiC particles 14 can be uniformly distributed, and the SiC particles 14 are less likely to fall off.

When the average particle diameter of the SiC particles 14 is less than the above lower limit value, the SiC particles 14 are less likely to be dispersed, and thus the above-described balance may be deteriorated. On the other hand, when the average particle diameter of the SiC particles 14 is more than the above upper limit value, the SiC particles 14 may easily fall off.

In the thixomolding material 10, the mass fraction of the SiC particles 14 in the total mass of the metal body 11 and the SiC particles 14 is 2.0 mass % or more and 40.0 mass % or less, preferably 3.0 mass % or more and 35.0 mass % or less, and more preferably 5.0 mass % or more and 20.0 mass % or less. By setting the mass fraction of the SiC particles 14 within the above range, the mechanical strength and the rigidity of the thixomolded article to be manufactured can be enhanced. By setting the mass fraction of the SiC particles 14 within the above range, a decrease in moldability of the thixomolding material 10 can be prevented.

When the mass fraction of the SiC particles 14 is less than the above lower limit value, the mechanical strength and the rigidity of the thixomolded article may not be sufficiently enhanced. On the other hand, when the mass fraction of the SiC particles 14 is more than the above upper limit value, the moldability of the thixomolding material 10 may be deteriorated.

The coating portion 12 may contain a substance other than the SiC particles 14. In this case, the content of the substance other than the SiC particles 14 may be less than the content of the SiC particles 14 in terms of mass ratio.

The SiC particles 14 may contain an element other than Si and C. In this case, the content of the element other than Si and C may be less than the content of Si and less than the content of C in terms of mass ratio.

2.3. Adhesive Portion

The adhesive portion 13 is interposed between the metal body 11 and the SiC particles 14 or between the SiC particles 14.

The adhesive portion 13 contains a binder. As the binder, organic materials that bond the metal body 11 to the coating portion 12 are used. Examples of the organic materials include various resins, waxes, alcohols, higher fatty acids, fatty acid metals, higher fatty acid esters, higher fatty acid amides, nonionic surfactants, and silicone-based lubricants. The various resins include: polyolefins such as polyethylene, polypropylene, and ethylene-vinyl acetate copolymers; acrylic resins such as polymethyl methacrylate and polybutyl methacrylate; styrene resins such as polystyrene; polyvinyl chloride; polyvinylidene chloride; polyamide; polyesters such as polyethylene terephthalate and polybutylene terephthalate; polyether; polyvinyl alcohol; polyvinyl pyrrolidone; and copolymers thereof. In addition, the binder may be a mixture containing at least one of these components and another component, or may be a mixture containing two or more of these components.

Among these, the binder preferably contains waxes, and more preferably contains paraffin wax or a derivative thereof. The waxes have a good binding property, and can strongly bond the metal body 11 to the SiC particles 14 or strongly bond the SiC particles 14 to each other. When using the waxes in combination with debindering conditions, it is possible to obtain a thixomolding material capable of recuding generation of gas during molding to a low level.

Examples of the waxes include natural waxes and synthetic waxes. The natural waxes include: plant waxes such as candelilla wax, carnauba wax, rice wax, Japan wax, and jojoba oil; animal waxes such as beeswax, lanolin, and spermaceti; mineral waxes such as Montan wax, ozokerite, and ceresin; and petroleum waxes such as paraffin wax, microcrystalline wax, and petrolatum. The synthetic waxes include: modified waxes such as synthetic hydrocarbons such as polyethylene wax, Montan wax derivatives, paraffin wax derivatives, and microcrystalline wax derivatives; hydrogenated waxes such as hardened castor oil and hardened castor oil derivatives; fatty acids such as 12-hydroxystearic acid; acid amides such as stearamide; and imides such as phthalic anhydride imide.

As described above, the thixomolding material 10 according to the embodiment includes the metal body 11 and the coating portion 12. The metal body 11 contains Mg as a main component. The coating portion 12 adheres to the surface of the metal body 11 via the binder, and contains the SiC particles 14 containing SiC as a main component. In the thixomolding material 10, the mass fraction of the SiC particles 14 in the total mass of the metal body 11 and the SiC particles 14 is 2.0 mass % or more and 40.0 mass % or less.

By performing thixomolding using such a thixomolding material 10, a thixomolded article in which SiC is uniformly dispersed can be manufactured. In such a thixomolded article, since SiC having a Young's modulus higher than that of Mg is uniformly dispersed, the rigidity can be enhanced. In addition, since SiC is uniformly dispersed, enlargement of Mg crystals precipitated in the course of solidification in thixomolding can be inhibited. Accordingly, minimization of the Mg crystals can be achieved, and slipping of a grain boundary can be prevented. As a result, the mechanical strength of the obtained thixomolded article can be enhanced.

The thixomolding material 10 may contain additives other than the metal body 11, the coating portion 12, and the adhesive portion 13 described above. Examples of the additives include a coupling agent, a surfactant, a dispersant, a lubricant, an antioxidant, an ultraviolet absorber, a thickener, a rust inhibitor, a preservative, and a fungicide.

3. Method for Manufacturing Thixomolding Material

Next, a method for manufacturing the above-mentioned thixomolding material 10 will be described.

Figure 3:
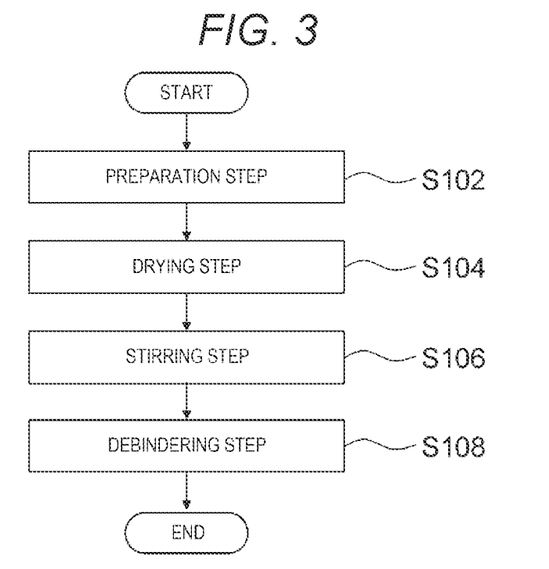
FIG. 3 is a process diagram illustrating a method for manufacturing the thixomolding material according to the embodiment.

FIG. 3 is a process diagram illustrating a method for manufacturing the thixomolding material according to the embodiment.

The method for manufacturing the thixomolding material 10 shown in FIG. 3 includes a preparation step S102, a drying step S104, a stirring step S106, and a debindering step S108.

3.1. Preparation Step

In the preparation step S102, a mixture containing a metal body 11, SiC particles 14, a binder, and a solvent is prepared. The metal body 11 is similar to the metal body 11 described above. In addition, the SiC particles 14 are similar to the SiC particles 14 described above.

The solvent is not particularly limited as long as it is a liquid in which the binder is dispersed. Examples of the solvent include water, isopropanol, and acetone. For mixing, a mixer, a kneader, or the like is used. This step may be a step of preparing a mixture prepared in advance.

The content of the binder in the mixture is not particularly limited, and is preferably 1 mass % or more and 30 mass % or less, more preferably 2 mass % or more and 15 mass % or less, and still more preferably 3 mass % or more and 10 mass % or less. By setting the content of the binder within the above range, the SiC particles 14 can be uniformly dispersed based on a dispersion action of the binder.

When the content of the binder is less than the above lower limit value, an amount of the binder is insufficient, and it may be difficult to uniformly adhere the SiC particles 14 to the metal body 11, and it may be difficult to uniformly disperse the SiC particles 14. On the other hand, when the content of the binder is more than the above upper limit value, the amount of the binder becomes excessive, and the SiC particles 14 which are not adhered to the metal body 11 may easily aggregate, or an amount of binder residue may increase in the debindering step S108 described later and an internal defect may easily occur in the thixomolded article.

The temperature of the solvent is preferably set to be equal to or higher than the melting point of the binder, if necessary. Accordingly, the binder is easily dissolved in the solvent. As a result, the binder can be dispersed more uniformly. The temperature of the solvent is preferably set to be higher than the melting point of the binder by 10° C. or more, and more preferably set to be higher by 20° C. or more and 50° C. or less.

In this case, the above-described mixture may be placed in a container, and the entire container may be heated from the outside using a hot bath or the like.

The melting point of the binder to be used is not particularly limited, and is preferably 40° C. or higher and 80° C. or lower, more preferably 43° C. or higher and 65° C. or lower, and still more preferably 45° C. or higher and 60° C. or lower. When the melting point of the binder is within the above range, the binder can be efficiently melted in a short time. In addition, when the melting point of the binder is within the above range, the thixomolding material 10 to be manufactured may have good lubricity in thixomolding, and can increase melt fluidity of the slurry.

3.2. Drying Step

In the drying step S104, the mixture is dried. Accordingly, the SiC particles 14 are adhered to the surface of the metal body 11 via the binder, and the solvent is volatilized to obtain a dried body. In the present embodiment, since the SiC particles 14 are dispersed using the binder, the SiC particles 14 can be adhered to the surface of the metal body 11 with a uniform thickness.

For drying, a method of heating the mixture, a method of exposing the mixture to a gas, or the like is used. Among these methods, when the mixture is heated, for example, the entire container containing the mixture may be heated using a hot bath or the like. In the drying step S104, the entire solvent in the mixture may be removed, or a part of the solvent may remain without being removed.

A temperature at which the mixture is heated may be equal to or higher than the temperature at which the solvent volatilizes and the binder softens, specifically, the temperature is set according to a composition of the solvent, and is preferably 40° C. or higher and 120° C. or lower, and more preferably 50° C. or higher and 80° C. or lower. Accordingly, the solvent can be volatilized and removed while preventing the SiC particles 14 adhered to the surface of the metal body 11 from falling off.

In addition, a time for heating the mixture is appropriately set depending on the heating temperature, and is, for example, preferably 10 minutes or longer and 300 minutes or shorter, and more preferably 20 minutes or longer and 200 minutes or shorter.

The drying step S104 may be performed as necessary, and may be omitted, or the drying step S104 and the stirring step S106 may be performed at the same time.

3.3. Stirring Step

In the stirring step S106, the mixture is stirred. When the drying step is performed, the dried mixture is stirred. For stirring, a method using a stirring bar, a stirrer, or the like, a method of shaking a container containing a mixture with a lid, or the like is used. By such stirring, the SiC particles 14 can be adhered to the surface of the metal body 11 via the binder. A part of the SiC particles 14 may be directly adhered to the surface of the metal body 11 without interposing the binder. In addition, by stirring, formation of a block by aggregation of metal bodies 11 can be prevented.

After the stirring step S106, the drying step S104 and the stirring step S106 may be repeated as necessary. Accordingly, since the SiC particles 14 are repeatedly adhered, the SiC particles 14 can be adhered to the surface of the metal body 11 in multiple layers. As a result, more SiC particles 14 can be adhered to the surface of the metal body 11. The number of repetitions is not particularly limited, and is, for example, 2 or more and 10 or less. Also in this case, the drying step S104 and the stirring step S106 may be performed at the same time.

3.4. Debindering Step

In the debindering step S108, a debindering treatment is performed on a stirred mixture. Accordingly, the thixomolding material 10 is obtained. Examples of the debindering treatment include a method of heating the mixture, and a method of exposing the mixture to a gas for decomposing the binder. Accordingly, at least a part of the binder contained in the mixture can be removed. As a result, by preventing a large amount of binder from being transferred into the heating cylinder 7, generation of a large amount of gas in the heating cylinder 7 can be prevented.

A heating temperature of the mixture in the debindering treatment is not particularly limited as long as it is a temperature at which the binder is thermally decomposed, and the heating temperature is preferably 200° C. or higher and 500° C. or lower, and more preferably 250° C. or higher and 450° C. or lower. By setting the heating temperature within the above range, the binder can be appropriately removed while preventing an adverse effect on the metal body 11 due to the debindering treatment.

When the heating temperature is lower than the above lower limit value, a large amount of binder which is not removed remains, and a large amount of gas may be generated in the heating cylinder 7. On the other hand, when the heating temperature is higher than the above upper limit value, there is a concern that an adverse effect due to heat may occur on the metal body 11, or the binder may be completely removed and the SiC particles 14 may fall off from the metal body 11.

A heating time for the mixture in the debindering treatment is not particularly limited, and may be, for example, 5 minutes or longer, and is preferably 1 hour or longer and 100 hours or shorter, and more preferably 10 hours or longer and 50 hours or shorter. Accordingly, the binder can be appropriately removed while preventing an adverse effect on the metal body 11 due to the debindering treatment.

An amount of the binder, that is, a content of the binder in the thixomolding material 10 after debindering is not particularly limited, and is preferably 0.001 mass % or more and 0.200 mass % or less, more preferably 0.010 mass % or more and 0.100 mass % or less, and still more preferably 0.015 mass % or more and 0.040 mass % or less. By setting the content of the binder in the thixomolding material 10 within the above range, the amount of the binder to be thermally decomposed in the heating cylinder 7 can be prevented from increasing more than necessary while ensuring adhesiveness of the coating portion 12 realized by the adhesive portion 13.

When the content of the binder is less than the above lower limit value, the amount of the binder is insufficient, and the coating portion 12 may easily fall off. On the other hand, when the content of the binder is more than the above upper limit value, the amount of the binder becomes excessive, a large amount of gas is generated in the heating cylinder 7, and voids may be easily generated in the thixomolded article.

As described above, the method for manufacturing the thixomolding material 10 according to the present embodiment includes the preparation step S102, the stirring step S106, and the debindering step S108. In the preparation step S102, the mixture containing the metal body 11 containing Mg as a main component, the SiC particles 14 containing SiC as a main component, the binder, and the solvent is prepared. In the stirring step S106, the mixture is stirred. In the debindering step S108, the stirred mixture is heated to remove at least a part of the binder contained in the mixture, thereby obtaining the thixomolding material 10. The mass fraction of the SiC particles 14 in the total mass of the metal body 11 and the SiC particles 14 is 2.0 mass % or more and 40.0 mass % or less. The content of the binder in the thixomolding material 10 is 0.001 mass % or more and 0.200 mass % or less.

According to such a configuration, even when the amount of the SiC particles 14 is large, the SiC particles 14 can be adhered to the surface of the metal body 11 via the binder, and thus the SiC particles 14 can be uniformly dispersed in the heating cylinder 7. Accordingly, the SiC particles 14 function as a filler, and the Mg crystals precipitated in the course of solidification can be miniaturized. As a result, a thixomolded article having high mechanical strength and high rigidity can be obtained.

The thixomolding material 10 does not necessarily have to be manufactured by this manufacturing method. That is, the thixomolding material 10 may be manufactured, for example, without going through the debindering step S108.

4. Thixomolded Article

Next, a thixomolded article according to the embodiment will be described.

Figure 4:
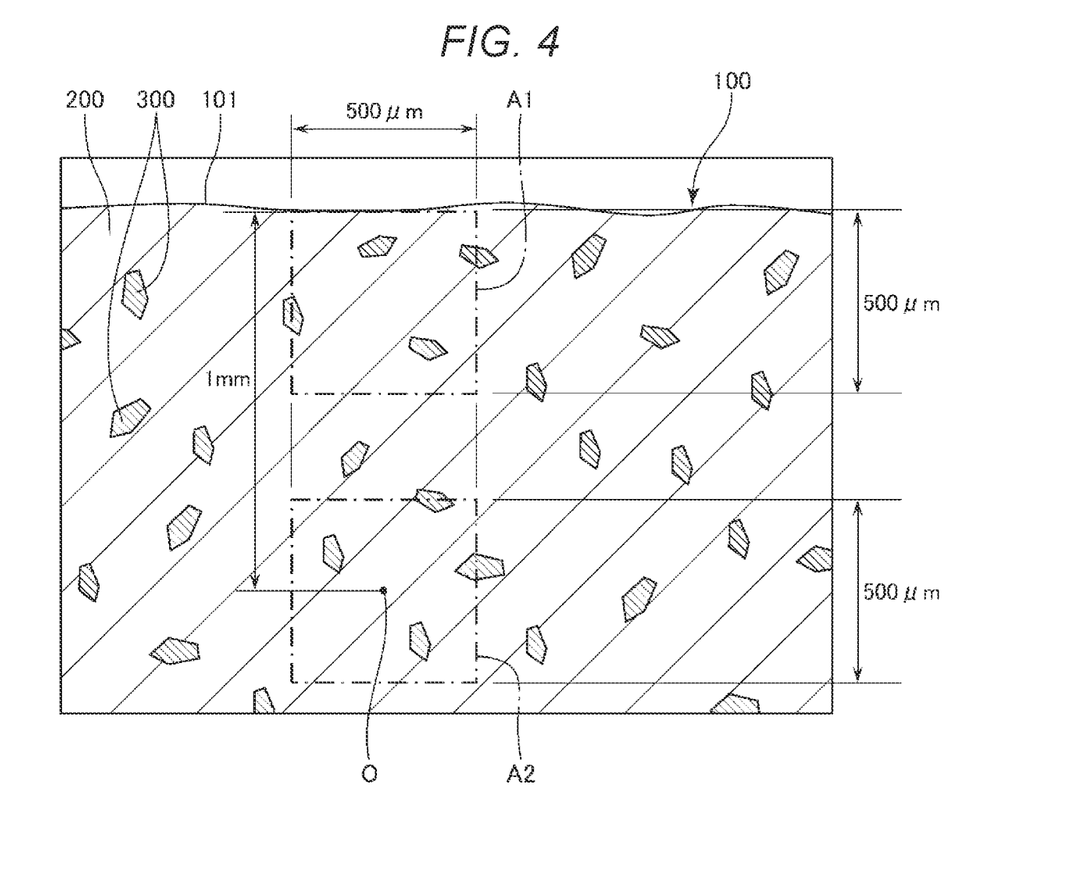
FIG. 4 is a partial cross-sectional view schematically showing a thixomolded article according to the embodiment.

FIG. 4 is a partial cross-sectional view schematically showing the thixomolded article according to the embodiment.

The thixomolded article 100 shown in FIG. 4 is a molded article obtained by a thixomolding method, and includes a matrix portion 200 and a particle portion 300. The matrix portion 200 is a portion mainly derived from the metal body 11 of the thixomolding material 10, and contains Mg as a main component. The particle portion 300 is a portion mainly derived from the coating portion 12 of the thixomolding material 10, and contains SiC as a main component.

As shown in FIG. 4, when viewing a cross section of the thixomolded article 100, an area occupied by the matrix portion 200 is larger than an area occupied by the particle portion 300. Therefore, the particle portion 300 is in a state of being dispersed in the matrix portion 200.

In the thixomolded article 100, the content of SiC is 2.0 mass % or more and 40.0 mass % or less, preferably 3.0 mass % or more and 35.0 mass % or less, and more preferably 5.0 mass % or more and 30.0 mass % or less.

In such a thixomolded article 100, since SiC is dispersed, the enlargement of the Mg crystals contained in the matrix portion 200 is prevented by SiC, and a crystal grain diameter can be reduced. In addition, the particle portion 300 containing SiC as a main component functions as a filler. Accordingly, the thixomolded article 100 has high mechanical strength and high rigidity.

The content of SiC is calculated based on an area fraction occupied by the particle portion 300, a specific gravity of the matrix portion 200, and a specific gravity of the particle portion 300 in the cross section of the thixomolded article 100. For the specific gravity of the matrix portion 200, for example, a specific gravity of a material constituting the metal body 11 can be used, and for the specific gravity of the particle portion 300, a specific gravity of a material constituting the SiC particles 14 can be used.

In addition, a content of Si and a content of C may be obtained by elemental analysis, and the content of SiC may be calculated based on the contents.

Examples of an elemental analysis method include: iron and steel-atomic absorption spectrometry defined in JIS G 1257:2000; iron and steel-ICP emission spectrometry defined in JIS G 1258:2007; iron and steel-spark discharge emission spectrometry defined in JIS G 1253:2002; iron and steel-X-ray fluorescence analysis defined in JIS G 1256: 1997; and weight, titration, and absorption photometry defined in JIS G 1211 to G 1237.

In particular, for measurement of the content of C, for example, an oxygen gas flow combustion (high-frequency induction furnace combustion)—infrared absorption method defined in JIS G 1211:2011 is used. Examples of an analyzer corresponding to this measurement method include a carbon/sulfur analyzer manufactured by LECO Japan Co., Ltd.

FIG. 4 illustrates a range A1 of 500 μm square starting from a surface 101 of the thixomolded article 100, and a range A2 of 500 μm square centered on a point at a depth of 1 mm from the surface 101. When an area fraction of the particle portion 300 in the range A1 is defined as As [%] and an area fraction of the particle portion 300 in the range A2 is defined as Ac [%], |As−Ac|/Ac is preferably 30.0% or less, more preferably 25.0% or less, and still more preferably 20.0% or less in the thixomolded article 100 according to the present embodiment.

In such a thixomolded article 100, a difference in occupied areas of the particle portion 300 between the range A1 located in the vicinity of the surface 101 and the range A2 located at a deeper position is reduced. That is, in the thixomolded article 100, uneven distribution of the particle portion 300 is prevented. Accordingly, the mechanical strength and the rigidity of the thixomolded article 100 can be further enhanced.

The area fraction As of the particle portion 300 in the range A1 is calculated as follows. First, in an observation image of the range A1, the area of the particle portion 300 is calculated by image processing. For the image processing, for example, image analysis software OLYMPUS Stream or the like can be used. A magnification of the observation image is preferably 300 times or more. Next, a ratio of the area of the particle portion 300 to a total area of the range A1 is calculated. This ratio is the area fraction As. The range A1 is a range having a square shape with a side of 500 μm, and at least a part of the range A1 may be in contact with the surface 101.

The area fraction Ac of the particle portion 300 in the range A2 is also calculated in the same manner as the area fraction As.

The range A2 is a range having a square shape with a side of 500 μm, and a center point O of the range A2 is a point at a depth of 1 mm from the surface 101. When a length in a depth direction is less than 2 mm in the cross section of the thixomolded article 100, a midpoint of the length in the depth direction can be regarded as the center point O.

The area fraction As and the area fraction Ac are both determined by the content of SiC in the thixomolded article 100, and are preferably 0.5% or more and 30.0% or less, more preferably 1.5% or more and 20.0% or less, and still more preferably 2.5% or more and 15.0% or less. Accordingly, the thixomolded article 100 has particularly high mechanical strength and high rigidity.

The average particle diameter of the particle portion 300 is preferably 0.3 μm or more and 10.0 μm or less, and more preferably 1.0 μm or more and 5.0 μm or less. When the average particle diameter of the particle portion 300 is within the above range, the particle portion 300 has a small diameter as a whole, and thus the particle portion 300 is less likely to become a starting point of a crack or the like. In addition, the particle portion 300 can be distributed more uniformly, and a function of preventing the enlargement of the Mg crystals can be exhibited in a wider region. Accordingly, the mechanical strength and the rigidity of the thixomolded article 100 can be further enhanced.

The average particle diameter of the particle portion 300 is calculated as follows. First, particle diameters of the particle portion 300 included in the range A1 and the range A2 are all measured. The particle diameter of the particle portion 300 is an intermediate value between the length of the major axis and the length of the minor axis in an image of the particle portion 300 included in the observation image. An average value of the particle diameters calculated in this manner is the average particle diameter of the particle portion 300.

An average aspect ratio of the particle portion 300 is preferably 3.0 or less, more preferably 2.5 or less, and still more preferably 2.0 or less. When the average aspect ratio of the particle portion 300 is within the above range, anisotropy of the structure of the particle portion 300 is reduced. Therefore, the mechanical strength and the rigidity of the thixomolded article 100 can be isotropically enhanced.

The average aspect ratio of the particle portion 300 is calculated as follows. First, the length of the major axis and the length of the minor axis of the particle portion 300 included in the range A1 and the range A2 are respectively obtained. Next, a ratio of the length of the major axis to the length of the minor axis is referred to as an "aspect ratio". An average value of the aspect ratios calculated in this manner is the average aspect ratio of the particle portion 300.

In the thixomolded article 100, as described above, the enlargement of the Mg crystals precipitated in the matrix portion 200 is prevented by an action of the particle portion 300.

An average particle diameter of the Mg crystals in the thixomolded article 100 is preferably 1.0 µm or more and 8.0 µm or less, more preferably 2.0 µm or more and 7.0 µm or less, and still more preferably 3.0 µm or more and 6.0 µm or less.

When the average particle diameter of the Mg crystals is within the above range, slipping is particularly less likely to occur at the grain boundary of the Mg crystals. Therefore, the mechanical strength of the thixomolded article 100 can be particularly enhanced.

The Mg crystals can be identified on an image by performing a crystal orientation analysis (EBSD analysis) on a cut surface of the matrix portion 200. Accordingly, an intermediate value between the length of the major axis and the length of the minor axis of the Mg crystals identified on the image can be set as a particle diameter of the Mg crystals. The average particle diameter of the Mg crystals can be obtained by averaging 100 or more measured particle diameters.

The tensile strength of the thixomolded article 100 is preferably 170 MPa or more and 350 MPa or less, and more preferably 200 MPa or more and 300 MPa or less. Further, a Young's modulus of the thixomolded article 100 is preferably 40 GPa or more and 80 GPa or less, and more preferably 44 GPa or more and 70 GPa or less.

The thixomolded article 100 having a tensile strength and a Young's modulus within the above ranges has particularly high specific strength and specific rigidity. Since such a thixomolded article 100 is lightweight and has high strength, and is thus suitable for, for example, parts used in a transportation device such as an automobile and an aircraft, parts used in a mobile device such as a mobile terminal and a notebook computer, and the like.

The tensile strength of the thixomolded article 100 is measured as follows. First, a test piece is cut out from the thixomolded article 100. Examples of the test piece include a No. 13 test piece defined in JIS. Next, the test piece is attached to a tensile tester, and stress corresponding to a maximum force applied to the test piece at 25° C. is calculated. The obtained stress is defined as the tensile strength of the thixomolded article 100.

The Young's modulus of the thixomolded article 100 is measured as follows. First, a test piece is cut out from the thixomolded article 100. Next, the test piece is attached to the tensile tester, and a tensile load is applied to the test piece at 25° C. Next, an amount of change in tensile strain when the tensile load is varied and an amount of change in tensile stress when the tensile load is varied are respectively calculated. Then, a ratio of the latter amount of change to the former amount of change is calculated, and the calculated ratio is defined as the Young's modulus of the thixomolded article 100. The Young's modulus of the thixomolded article 100 may be a value measured by a method other than the above-mentioned measurement method, for example, a resonance method or an ultrasonic pulse method.

A Vickers hardness of the surface 101 of the thixomolded article 100 is preferably 80 or more and 350 or less, more preferably 90 or more and 300 or less, and still more preferably 100 or more and 250 or less.

When the Vickers hardness is within the above range, it is possible to obtain a thixomolded article 100 that has a high surface hardness and is less likely to be scratched.

The Vickers hardness of the surface 101 of the thixomolded article 100 is measured in accordance with a method of Vickers hardness test specified in JIS Z 2244:2009. A measurement load is 200 gf.

A thermal conductivity of the thixomolded article 100 is preferably 52 W/(m·K) or more, more preferably 54 W/(m·K) or more, and still more preferably 57 W/(m·K) or more. The thixomolded article 100 having such a thermal conductivity can also be applied to, for example, a portion requiring heat dissipation.

The thermal conductivity of the thixomolded article 100 is measured by, for example, a laser flash method.

The thixomolding material, the method for manufacturing the thixomolding material, and the thixomolded article according to the present disclosure are described above based on the illustrated embodiments. However, the thixomolding material and the thixomolded article according to the present disclosure are not limited to the above embodiment, and may be, for example, those obtained by adding any component to the above embodiment. The method for manufacturing the thixomolding material according to the present disclosure may be one obtained by adding any desired step to the above embodiment.

EXAMPLES

Next, specific examples of the present disclosure will be described.

5. Manufacturing of Thixomolding Material 5.1. Sample No. 1

First, a magnesium alloy chip as a metal body, SiC particles, a binder, and a solvent were mixed to obtain a mixture. As the magnesium alloy chip, a chip of 4 mm×2 mm×1 mm made of an AZ91D alloy manufactured by STU, Inc. was used. The AZ91D alloy is an Mg-based alloy containing 9 mass % of Al and 1 mass % of Zn. In addition, as the binder, "Paraffin Wax 115" manufactured by Nippon Seiro Co., Ltd. was used. The melting point of the paraffin wax 115 is 48° C. Further, as the solvent, 35 mL of isopropanol was used per 4.5 g of the binder.

Next, the obtained mixture was heated to obtain a dried body. Subsequently, the obtained dried body was stirred. Thereafter, an operation of further heating the stirred dried body and then stirring the heated dried body was repeated three times. For stirring, a method of shaking a container containing the dried body was used.

Next, the stirred dried body was subjected to a debindering treatment. Accordingly, at least a part of the binder was removed to obtain a thixomolding material. In the obtained thixomolding material, almost the entire surface of the magnesium alloy chip was coated with the SiC particles. Manufacturing conditions in the above manufacturing method are shown in Table 1. In Table 1, a charge amount of the SiC particles is a ratio of a mass of the charged SiC particles to a total mass of the magnesium alloy chip and the SiC particles. A charge amount of the binder is a ratio of a mass of the charged binder to a mass of the entire thixomolding material.

5.2. Sample Nos. 2 to 5

Thixomolding materials were obtained in the same manner as in Sample No. 1 except that the manufacturing conditions were changed as shown in Table 1.

5.3. Sample No. 6

A thixomolding material was obtained in the same manner as in Sample No. 1 except that SiC particles and a binder were not used.

5.4. Sample Nos. 7 to 14

Thixomolding materials were obtained in the same manner as in Sample No. 1 except that the manufacturing conditions were changed as shown in Table 1. When the thixomolding material of Sample No. 13 was manufactured, the debindering treatment was omitted.

5.5. Sample No. 15

A thixomolding material was obtained in the same manner as in Sample No. 1, except that the SiC particles were used, but the binder was not used.

In Table 1, among the thixomolding materials of the respective sample Nos., those corresponding to the present disclosure are referred to as "Examples," and those not corresponding to the present disclosure are referred to as "Comparative Examples".

6. Evaluation of Thixomolding Material

6.1. Amount of SiC Particles after Debindering

For the thixomolding material of each sample No., an amount of the SiC particles after debindering was calculated by the following method.

First, a mass M1 of the thixomolding material was measured. Since the thixomolding material is debindered, the remaining binder is regarded as substantially zero, and is not considered for calculation. Next, the thixomolding material was immersed in acetone and washed with an ultrasonic cleaner for 10 minutes. Accordingly, the adhered SiC particles can be removed, and only the magnesium alloy chip can be taken out. Next, the magnesium alloy chip after washing was taken out from acetone, dried, and then a mass M2 was measured.

Then, a mass fraction of the SiC particles with respect to the magnesium alloy chip calculated by (M1−M2)/M1×100 was defined as an amount [%] of the SiC particles after debindering. Calculation results are shown in Table 1.

6.2. Adhesion Rate of SiC

An adhesion rate of the SiC particles was calculated by dividing the amount of the SiC particles after debindering by the charge amount of the SiC particles. Calculation results are shown in Table 1.

6.3. Amount of Binder after Debindering

For the thixomolding material of each sample No., an amount of the binder after debindering was calculated by the following method.

First, a thermogravimetric change in a temperature range of 50° C. to 450° C. of one thixomolding material was measured by a differential thermogravimetric simultaneous measurement device (TGA/DSC1LF) manufactured by Mettler-Toledo. The temperature was increased at a temperature increase rate of 10° C./min while air was allowed to flow in at a flow rate of 30 mL/min in the atmosphere. Then, in order to eliminate an influence of the solvent, a weight change at 450° C., with reference to a weight at 200° C., was calculated as the amount of the binder after debindering. Calculation results are shown in Table 1.

TABLE 1

| | | Manufacturing condition for thixomolding material | | | | | | | | Evaluation result of thixomolding material | | |
|---|---|---|---|---|---|---|---|---|---|---|---|---|
| | | SiC particles | | | | | De- | | | SiC particles | | Binder |
| Sample No. | Example/ Comparative Example | Average particle diameter μm | Charge amount mass % | Binder Charge amount mass % | Drying temperature ° C. | Drying time min | Number of repetitions time(s) | bindering temperature ° C. | Debindering time h | Amount after debindering mass % | Adhesion rate % | Amount after debindering mass % |
| 1 | Example | 3 | 3.0 | 5 | 65 | 120 | 3 | 320 | 24 | 2.8 | 93 | 0.022 |
| 2 | Example | 3 | 8.0 | 8 | 65 | 120 | 3 | 400 | 24 | 7.6 | 95 | 0.017 |
| 3 | Example | 3 | 10.0 | 10 | 65 | 120 | 3 | 320 | 24 | 9.5 | 95 | 0.026 |
| 4 | Example | 5 | 15.0 | 10 | 65 | 120 | 3 | 320 | 24 | 14.7 | 98 | 0.031 |
| 5 | Example | 10 | 28.0 | 15 | 65 | 120 | 3 | 290 | 48 | 23.8 | 85 | 0.035 |
| 6 | Comparative Example | — | 0.0 | 0 | — | — | — | — | — | — | — | — |
| 7 | Comparative Example | 3 | 1.0 | 2 | 65 | 120 | 3 | 320 | 24 | 0.7 | 70 | 0.010 |
| 8 | Comparative Example | 3 | 45.0 | 32 | 65 | 120 | 3 | 220 | 24 | 33.8 | 75 | 0.250 |
| 9 | Comparative Example | 3 | 5.0 | 0.5 | 65 | 120 | 3 | 460 | 24 | 1.6 | 32 | 0.0005 |
| 10 | Example | 3 | 10.0 | 5 | 65 | 120 | 3 | 320 | 24 | 7.7 | 77 | 0.018 |
| 11 | Example | 5 | 10.0 | 5 | 65 | 120 | 2 | 400 | 2 | 8.8 | 88 | 0.027 |
| 12 | Example | 15 | 10.0 | 10 | 65 | 120 | 0 | 250 | 12 | 8.2 | 82 | 0.038 |
| 13 | Comparative Example | 3 | 10.0 | 5 | 65 | 120 | 3 | — | — | 5.4 | 54 | 4.6 |
| 14 | Comparative Example | 3 | 10.0 | 5 | 65 | 120 | 1 | 220 | 2 | 6.5 | 65 | 0.35 |
| 15 | Comparative Example | 3 | 10.0 | 0 | — | — | — | — | — | 10 | 10 | — |

As shown in Table 1, it is confirmed that in the thixomolding materials corresponding to Examples, although the amount of the binder is reduced to the minimum by debindering, the SiC particles are adhered at a sufficient adhesion rate.

7. Manufacturing of Thixomolded Article

7.1. Sample No. 16

The thixomolding material of Sample No. 1 was charged into an injection molding machine to obtain a thixomolded article of Sample No. 16. As the injection molding machine, a magnesium injection molding machine JLM75MG manufactured by The Japan Steel Works, Ltd. was used.

7.2. Sample Nos. 17 to 30

Thixomolded articles were obtained in the same manner as in Sample No. 16 except that the manufacturing conditions were changed as shown in Table 2.

8. Analysis of Thixomolded Article 8.1. Cross Section Observation

The thixomolded article of each sample No. was cut, and the cut surface was observed with an optical microscope. Next, the observation image was subjected to image processing to identify a particle portion, and an average aspect ratio and an average particle diameter of the particle portion were measured. Measurement results are shown in Table 2.

In addition, ranges A1 and A2 as shown in FIG. 4 are identified, and the area fractions As and Ac of the particle portion were calculated. Then, |As−Ac|/Ac was calculated in terms of percentage. Calculation results are shown in Table 2.

8.2. Content of SiC

For the thixomolded article of each sample No., the content of SiC was calculated based on the area fraction of the particle portion and the specific gravities of Mg and SiC. Calculation results are shown in Table 2.

8.3. Average Particle Diameter of Mg Crystals

For the thixomolded article of each sample No., the average particle diameter of the Mg crystals was calculated by EBSD analysis. Calculation results are shown in Table 2.

9. Evaluation of Thixomolded Article 9.1. Moldability

The thixomolded article of each sample No. was observed, and a molded state of the thixomolded article was evaluated based on melt fluidity, presence or absence of internal defects due to inclusion of blowholes and air, and the like. Specifically, those having many defects in melt fluidity and internal defects were evaluated as "NG," and those having relatively few such defects were evaluated as "OK". Evaluation results are shown in Table 2.

9.2. Tensile Strength

The tensile strength of the thixomolded article of each sample No. was measured. Specifically, a test piece conforming to JIS standard was formed from the thixomolded article, and the tensile strength was measured by a tensile tester. Measurement results are shown in Table 2.

9.3. Young's Modulus

The Young's modulus of the thixomolded article of each sample No. was measured. Measurement results are shown in Table 2.

9.4. Thermal Conductivity

The thermal conductivity of the thixomolded article of each sample No. was measured. Measurement results are shown in Table 2.

TABLE 2

| Sample No. | Example/ Comparative Example | Sample No. of material | Manufacturing condition for thixomolded articles and analysis result ||||| Evaluation result of thixomolded article ||||
|---|---|---|---|---|---|---|---|---|---|---|---|
| | | | Particle portion |||| Average particle diameter of Mg crystals | | | | |
| | | | Average aspect ratio | Average particle diameter μm | \|As−Ac\|/ Ac % | Content of SiC mass % | | Moldability | Tensile strength MPa | Young's modulus GPa | Thermal conductivity W/(m·K) |
| 16 | Example | 1 | 1.4 | 2.4 | 15.8 | 2.6 | 6.5 | OK | 221 | 45 | 53 |
| 17 | Example | 2 | 1.6 | 3.6 | 14.5 | 6.5 | 4.8 | OK | 208 | 45 | 54 |
| 18 | Example | 3 | 1.9 | 4.2 | 12.3 | 8.2 | 4.2 | OK | 217 | 46 | 57 |
| 19 | Example | 4 | 2.1 | 5.6 | 10.3 | 13.4 | 3.8 | OK | 212 | 53 | 54 |
| 20 | Example | 5 | 2.6 | 7.4 | 18.5 | 18.2 | 2.3 | OK | 215 | 64 | 60 |
| 21 | Comparative Example | 6 | — | — | — | 0.0 | 8.7 | OK | 192 | 42 | 51 |
| 22 | Comparative Example | 7 | 1.6 | 5.5 | 16.9 | 0.5 | 8.2 | OK | 180 | 42 | 52 |
| 23 | Comparative Example | 8 | 2.0 | 7.5 | 55.4 | 30.1 | 2.9 | NG | 85 | 38 | 61 |
| 24 | Comparative Example | 9 | 4.1 | 2.6 | 34.2 | 0.6 | 5.5 | OK | 108 | 40 | 54 |
| 25 | Example | 10 | 1.5 | 2.1 | 11.4 | 5.7 | 4.6 | OK | 218 | 46 | 55 |
| 26 | Example | 11 | 2.1 | 3.4 | 9.3 | 4.8 | 4.3 | OK | 215 | 45 | 54 |
| 27 | Example | 12 | 2.9 | 9.8 | 20.6 | 7.1 | 4.5 | OK | 201 | 45 | 55 |
| 28 | Comparative Example | 13 | 3.7 | 2.4 | 35.6 | 0.5 | 9.1 | NG | 158 | 43 | 52 |
| 29 | Comparative Example | 14 | 2.6 | 1.6 | 32.1 | 1.1 | 7.6 | NG | 169 | 43 | 53 |
| 30 | Comparative Example | 15 | 1.8 | 3.4 | 34.3 | 0.6 | 8.5 | OK | 185 | 40 | 51 |

As is clear from Table 2, it is confirmed that the thixomolded articles corresponding to Examples have higher mechanical strength and higher rigidity than the thixomolded articles corresponding to Comparative Examples. In addition, it is confirmed that when the content of SiC is too low, the mechanical strength and the rigidity cannot be sufficiently enhanced, and on the other hand, when the content of SiC is too high, the moldability is poor.

Further, in Comparative Examples in which no binder is added in the manufacturing of the thixomolding material, the mechanical strength and the rigidity of the thixomolded article cannot be enhanced. The reason for the above includes that SiC particles fall off from the magnesium alloy chip and the SiC particles cannot be sufficiently dispersed.

What is claimed is:

1. A thixomolded article comprising:
   a surface;
   a matrix portion that contains Mg as a main component; and
   a particle portion that is dispersed in the matrix portion, wherein
   the particle portion contains SiC as a main component,
   a content of SiC is 2.0 mass % or more and 40.0 mass % or less,
   a tensile strength of the thixomolded article is 170 MPa or more and 350 MPa or less, a Young's modulus of the thixomolded article is 40 GPa or more and 80 GPa or less, and when a 500 µm square area starting from the surface is defined as A1, a 500 µm square area centered at a point 1 mm deep from the surface is defined as A2, an area fraction of the particle portion in the area A1 is defined as As [%], and an area fraction of the particle portion in the area A2 is defined as Ac [%]. |As−Ac|/Ac is 30.0% or less.

2. The thixomolded article according to claim 1, wherein an average particle diameter of the particle portion is 0.3 µm or more and 10.0 µm or less.

* * * * *